United States Patent
Chustz

(10) Patent No.: US 9,045,941 B2
(45) Date of Patent: Jun. 2, 2015

(54) HYBRID BEARINGS FOR DOWNHOLE MOTORS

(71) Applicant: Scientific Drilling International, Inc., Houston, TX (US)

(72) Inventor: Mark Chustz, Porter, TX (US)

(73) Assignee: SCIENTIFIC DRILLING INTERNATIONAL, INC., Houston, TX (US)

(*) Notice: Subject to any disclaimer, the term of this patent is extended or adjusted under 35 U.S.C. 154(b) by 246 days.

(21) Appl. No.: 13/660,608

(22) Filed: Oct. 25, 2012

(65) Prior Publication Data

US 2014/0116780 A1 May 1, 2014

(51) Int. Cl.
*E21B 7/00* (2006.01)
*F16C 21/00* (2006.01)

(52) U.S. Cl.
CPC .. *E21B 7/00* (2013.01); *F16C 21/00* (2013.01)

(58) Field of Classification Search
CPC .............. E21B 4/02; E21B 3/00; E21B 7/00; F04C 14/20; F04C 2/1071; F04C 19/14; F04C 19/10; F16C 21/00; F16C 19/00; F16C 3/00

USPC .................. 175/17, 57; 418/16; 384/609, 452
See application file for complete search history.

(56) References Cited

U.S. PATENT DOCUMENTS 4,620,601 A 11/1986 Nagel
2011/0192648 A1* 8/2011 Baudoin ....................... 175/107

* cited by examiner

*Primary Examiner* — Yong-Suk (Philip) Ro
(74) *Attorney, Agent, or Firm* — Adolph Locklar

(57) ABSTRACT

A bearing assembly for use in a down-hole drilling apparatus includes a bearing housing configured for connection to a drill string and a mandrel disposed at least partially within the bearing housing. The mandrel is configured to rotate about a longitudinal axis extending therethrough. A hybrid thrust bearing package is provided and disposed radially between the bearing housing and the mandrel. The hybrid thrust bearing package includes a plurality of ball bearings movable through at least one race, an annular stator supported by the bearing housing and an annular rotor ring supported on and rotatable with the mandrel. The annular stator and rotor rings define first and second flat PDC bearing surfaces engaged with one another at a bearing interface oriented generally orthogonally with respect to the longitudinal axis.

12 Claims, 3 Drawing Sheets

HYBRID BEARINGS FOR DOWNHOLE MOTORS

BACKGROUND OF THE DISCLOSURE

1. Technical Field

This invention relates generally to bearing assemblies. In particular, a bearing assembly of the present disclosure may be employed, e.g., in the down-hole drilling field, and may be disposed in a bottom hole assembly (BHA) to accommodate rotational motion of a drill bit relative to an elongate upper portion of a drill string.

2. Description of Related Art

Often in down-hole drilling operations, a down-hole drilling motor is suspended from the lower end of a string of drill pipe. A drilling fluid may be transmitted through the drill string and circulated through the drilling motor to induce rotation of a drill bit. The rotating drill bit engages a subterranean formation to produce a borehole therein.

To support the rotation of the drill bit, and to reduce frictional wear caused thereby, a bearing assembly is generally provided with the drilling motor. These motor bearing assemblies are subject to axial or thrust loads. For example, a least a portion of the weight of the drill string may be placed on the bit to enhance the drilling, and this weight on bit ("WOB") passes through the bearing assembly. Also, expected axial loads include forces generated as the drill bit engages the formation, and bounces off the bottom of the borehole. In certain conventional down-hole drilling motors, vertical thrust bearings are provided, which include hard bearing surfaces such as diamond studs. These hard bearing surfaces are referred to in this application as polycrystalline diamond compact bearings ("PDC bearings"). A more detailed description of PDC bearings may be found, e.g., in U.S. Pat. No. 4,620,601 to David D. Nagel, the entire content of which is incorporated herein by reference. The bearings are also subject to radial loads, e.g., loads generated as the sides of the bit engage the formation. Radial loads are particularly relevant in directional or horizontal drilling operations.

In the drilling environment, the radial space available for equipment is limited by the size of the hole to be drilled. Additionally, the axial space available may also be limited by factors such as the necessary turning radius of the bit in a directional drilling operation. Accordingly, to increase the load carrying capacity of a bearing in a drilling environment, consideration must be taken to accommodate the expected loads in the space available.

SUMMARY OF THE DISCLOSURE

In one embodiment of the present disclosure, a motor bearing assembly for use in a down-hole drilling apparatus includes a bearing housing that defines upper and lower portions, wherein the upper portion of the bearing housing is configured for connection to a drill string. A mandrel is disposed at least partially within the bearing housing, and is configured to rotate about a longitudinal axis extending therethrough. A hybrid thrust bearing package is disposed radially between the bearing housing and the mandrel. The hybrid thrust bearing package includes a plurality of ball bearings movable through at least one race, an annular stator ring supported by the bearing housing and defining a first flat PDC bearing surface, and an annular rotor ring supported on and rotatable with the mandrel defining a second flat PDC bearing surface. The first and second flat PDC bearing surfaces are engaged at a bearing interface that is oriented generally orthogonally with respect to the longitudinal axis.

The motor bearing assembly may further include an upper radial bearing longitudinally spaced from the thrust bearing package, wherein the upper radial bearing defines an annular bearing surface. Also, the motor bearing assembly may further include a lower radial bearing longitudinally spaced from the hybrid thrust-bearing package. The lower radial bearing may include an inner annular member coupled to the mandrel such that the inner annular member rotates with the mandrel about the longitudinal axis, and an outer annular member that is concentric with the inner annular member and coupled to the bearing housing such that the outer annular member resists rotation about the longitudinal axis. The lower radial bearing may define an annular bearing surface between the inner and outer annular members.

The hybrid thrust bearing package may include a plurality of longitudinally spaced races. Also, the annular stator ring of the hybrid thrust bearing package may include a plurality of PDC compacts and a support element wherein the plurality of PDC compacts are carried by the support element such that the plurality PDC compacts project from a face of the support element to define the first flat PDC bearing surface. The second flat PDC bearing surface may be defined by a number of PDC compacts that is unequal to a number of PDC compacts defining the first flat bearing surface.

According to another embodiment of the present disclosure, a drilling apparatus includes a bearing housing and a power section comprising a power transmission shaft. The drilling motor is configured to provide rotational motion to the power transmission shaft about a longitudinal axis relative to the bearing housing. A mandrel is coupled to the power transmission shaft for rotation therewith. The mandrel extends at least partially through the bearing housing and is configured for connection to a drill bit to transmit rotational motion from the power transmission shaft to the drill bit. A hybrid thrust bearing package is provided to accommodate rotational motion of the mandrel. The hybrid thrust bearing package includes plurality of ball bearings movable through at least one race extending circumferentially about the longitudinal axis and a set of PDC bearings defining a generally planar PDC bearing interface substantially orthogonal to the longitudinal axis.

The drilling apparatus may further include a flow diverter interconnected between the power section and the mandrel, wherein the flow diverter is configured to direct drilling fluid exiting the power section to the hybrid thrust bearing package.

According to another embodiment of the present disclosure a method of operating a drilling motor includes the steps of (a) providing a power section and a mandrel, wherein the mandrel is operatively coupled to the power section such that rotary motion is transmitted from the power section to the mandrel, (b) providing a hybrid thrust bearing assembly, the hybrid thrust bearing assembly including a plurality of ball bearings movable through at least one race extending circumferentially about the mandrel and a set of PDC bearings defining a generally planar PDC bearing interface extending circumferentially about the mandrel (c) passing a drilling fluid through the power section to produce rotary motion in the power section, thereby rotating the mandrel about a longitudinal axis, and (d) transmitting a thrust load in the direction of the longitudinal axis through the plurality of ball bearings and through the PDC bearing interface.

The method may also include the steps of (e) providing a drill bit coupled to the mandrel (f) engaging a subterranean formation with the drill bit to produce a borehole in the subterranean formation wherein the thrust load is transmitted through the drill bit and the mandrel, and transmitting a radial load through the plurality ball bearings.

BRIEF DESCRIPTION OF THE DRAWINGS

The present disclosure is best understood from the following detailed description when read with the accompanying figures. In accordance with the standard practice in the industry, various features may not be drawn to scale.

DESCRIPTION OF EMBODIMENTS

It is to be understood that the following disclosure provides many different embodiments, or examples, for implementing different features of various embodiments. Specific examples of components and arrangements are described below to simplify the present disclosure. These are, of course, merely examples and are not intended to be limiting.

Figure 1:
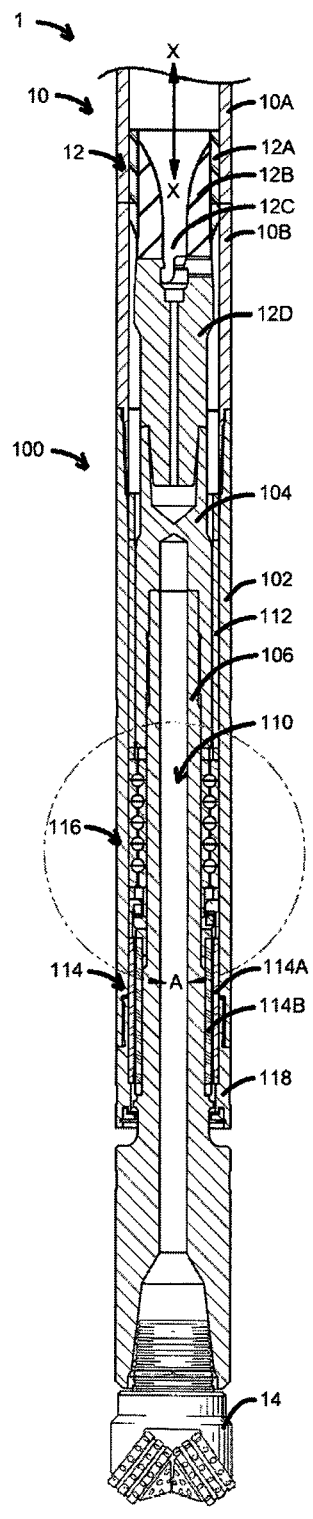
FIG. 1 is cross-sectional side view of a drilling apparatus, which includes a bearing assembly in accordance with one or more aspects of the present disclosure.

FIG. 1 illustrates one embodiment of a drilling apparatus 1 in accordance with the present disclosure. An elongate drill string 10 generally defines a longitudinal axis X-X along a length thereof. The drill string 10 may comprise multiple sections of drill pipe, e.g. sections 10a, 10b, interconnected with one another in an end to end configuration by screw-threaded joints or any other suitable type of connection. Thus, the drill string 10 may extend a significant distance from an upper surface of a well to down-hole components near the bottom of a borehole. As depicted in FIG. 1, the longitudinal axis X-X extends through each of the components of the drilling apparatus 1 since the drilling apparatus 1 arranged for vertical drilling. In some embodiments, the drill string 10 may be configured to accommodate a wellbore that deviates from the vertical. It will be appreciated that additional axes (other than axis X-X) will be defined through various components of the drilling apparatus 1 deviating from the vertical. As used herein, the term "upper" refers to a direction or side of a component that is oriented toward the surface of a borehole, while the term "lower refers" to the direction or side of a component oriented toward the portion of the borehole most distant from the surface.

A power section 12 of a drilling motor (depicted schematically) is supported near a lower end of the drill string, and may comprise any type of conventional drilling motor power section, such as a power section of a turbodrill or a positive displacement motor. The power section 12 includes a stator 12A fixedly coupled to the drill string 10 such that the stator 12A remains relatively stationary with respect to the drill string 10. A rotor 12B is disposed within the stator 12A such that the rotor 12B is free to rotate with respect to the stator 12A, e.g., about the longitudinal axis X-X. The rotor 12B is configured such that transmission of a drilling fluid through a central channel 12C defined therein induces rotation of the rotor 12B. Extending downwardly from the rotor 12B, a power transmission shaft 12D is provided, which rotates along with the rotor 12B.

The power section 12 operates to supply rotational motion to a drill bit 14 through a motor bearing assembly 100. The drill bit 14 may comprise any type of drill bit that is configured to drill into a geologic formation upon rotation thereof. Typically, the drill bit 14 will include at least one passageway (not shown) therein to permit passage of the drilling fluid employed to drive the power section 12. Once the drilling fluid has exited the drill bit 14, the drilling fluid may be employed to carry cuttings generated by operation if the drill bit 14 out of a well bore.

The motor bearing assembly 100 includes a tubular bearing housing 102 that is coupled to the drill string 10 such that the bearing housing 102 remains relatively stationary thereto when the power section 12 rotates the drill bit 14. The bearing housing 102 generally provides support for rotational motion of a flow diverter 104 and a mandrel 106, which together couple the drill bit 14 to the power section 12. The flow diverter 104 is coupled to the power transmission shaft 12B of power section 12, and operates to divert a portion of the drilling fluid exiting the power section 12 into a passage of the 110 of the drilling mandrel 106. The passage 110 permits transmission of the drilling fluid to drill bit 14, and in some embodiments, to the various bearing components discussed below to provide lubrication of the bearing components.

To further support the rotational motion of the flow diverter 104 and mandrel 106, an upper radial bearing 112, lower radial bearing 114 and a hybrid thrust bearing package 116 are provided. The hybrid thrust bearing package 116 is disposed longitudinally between the upper and lower radial bearings 112, 114. The bearings 112, 114 and 116 are appropriately held in axial compression within the bearing housing 102 by an end nut 118 threaded to a lower end of the bearing housing 102.

The upper radial bearing 112 is an annular member disposed radially between the bearing housing 102 and a flow diverter 104. The upper radial bearing 112 thus includes an inner circumferential bearing surface (not shown) facing flow diverter 104 and an outer circumferential bearing surface facing the bearing housing 102. The lower radial bearing 114 includes a pair of concentric annular members 114A and 114B. The outer annular member 114B is supported by the bearing housing 102, and the inner annular member 114B is supported by and is rotatable with the mandrel 106. Thus, the lower radial bearing 114 defines an annular bearing interface 114C between the inner and outer annular members 114A and 114B. The upper and lower radial bearings 112, 114 are constructed of cemented tungsten carbide, or a suitable ceramic, metal, or other bearing material. It will be appreciated that the upper and lower radial bearings 112, 114 serve maintain correct alignment of the rotating components, e.g., the flow diverter 104 and the mandrel 106 within the bearing housing 102.

Figure 2:
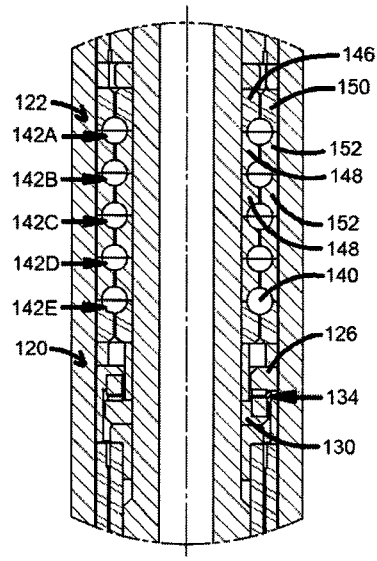
FIG. 2 is an enlarged view of the area of interest "A" identified FIG. 1, which depicts a hybrid thrust bearing package.

Referring now to FIG. 2, the hybrid thrust-bearing package 116 includes a set of PDC bearings 120 and a ball bearing thrust pack 122. The set of PDC bearings 120 include a stator ring 126 and a rotor ring 130. The stator ring 126 is fixed from rotation along with the bearing housing 102. Various mechanisms may be employed to rotationally fix the stator ring 126 such as a spline joint, threaded fasteners, or by frictional contact generated by an o-ring (not shown) disposed between the stator ring 126 and the bearing housing 102. The rotor ring 130 may be similarly fixed to the mandrel 106, and thus, rotates therewith. The rotor ring 130 bears against stator ring 126 along a bearing interface 134, which is oriented generally orthogonally with respect to the longitudinal axis X-X.

The ball bearing thrust pack 122 includes a plurality of ball bearings 140 disposed within a plurality of races 142A, 142B, 142C, 142D and 142E. In the interest of clarity, only one ball bearing 140 is depicted. However, it will be recognized that each of the races 142A, 142B, 142C, 142D and 142E may receive a plurality of ball bearings therein. Uppermost race 142A and lowermost race 142E are defined in a void disposed between an inner race end cap 146, an inner race track element 148, an outer race end cap 150 and outer race track element 152. Longitudinally central races 142B, 142C and 142D are each defined in a void disposed between a pair of inner race track elements 148 and a pair of outer race track elements 152.

Figure 3A:
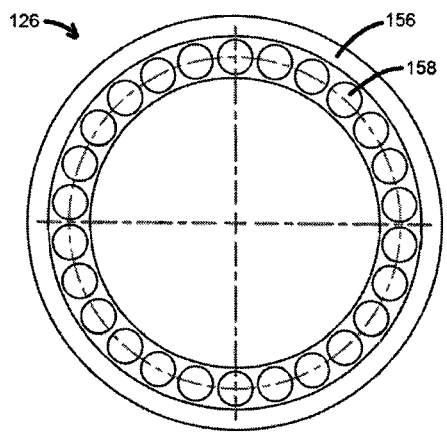
FIGS. 3A and 3B are respectively front and cross-sectional side views of a stator ring of the hybrid thrust bearing package of FIG. 2.
Figure 3B:
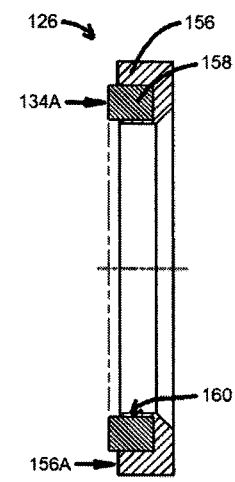

Referring now to FIGS. 3A and 3B, the stator ring 126 comprises an annular support element 156 and a plurality of composite PDC compacts 158 disposed in complementary pockets 160 formed in a lower face 156A of the support element 156. The support element 156 may be constructed of stainless steel, tungsten carbide or a similar metal. The PDC compacts 158 are constructed of a mass of polycrystalline diamond particles, generally present in an amount of more than 70% by volume, bonded under diamond synthesis conditions. The PDC compacts 158 project from the lower face 156A of the support element 156, and thus, when the stator ring 126 is assembled into the hybrid thrust bearing package 116 (FIG. 1), the PDC compacts 158 define a lower-most face 134A of the stator ring 126.

Figure 4A:
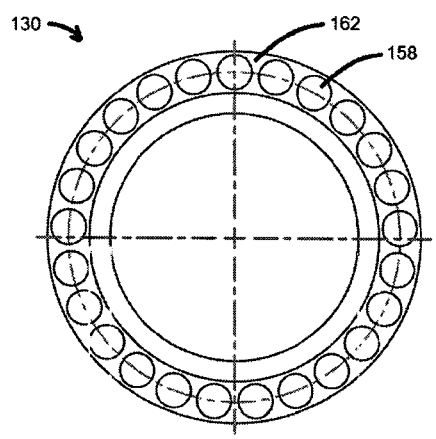
FIGS. 4A and 4B are respectively front and cross sectional side views of a rotor ring of the hybrid thrust bearing package of FIG. 2.
Figure 4B:
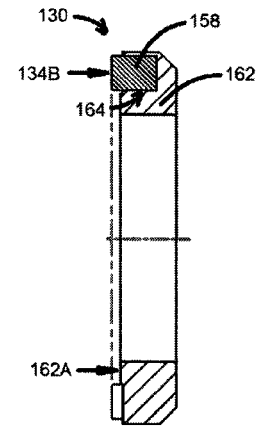
Figure 5:
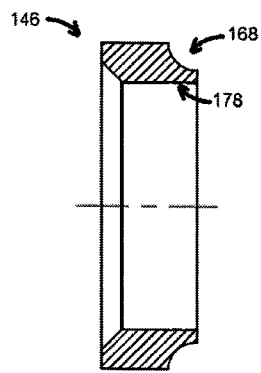
FIG. 5 is a cross-sectional side view of an inner race end spacer element of the hybrid thrust bearing package of FIG. 2.
Figure 6:
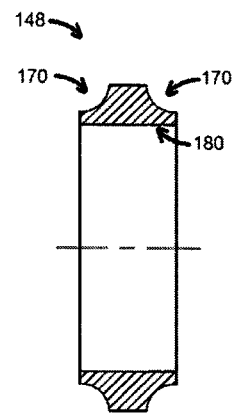
FIG. 6 is a cross-sectional side view of an inner race element of the hybrid thrust bearing package of FIG. 2.
Figure 7:
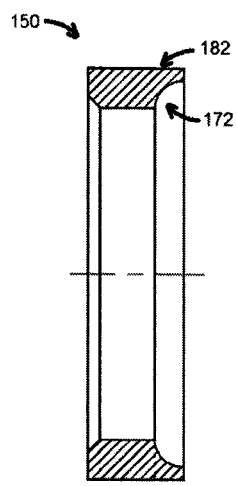
FIG. 7 is a cross-sectional side view of an outer race end spacer element of the hybrid thrust bearing package of FIG. 2.
Figure 8:
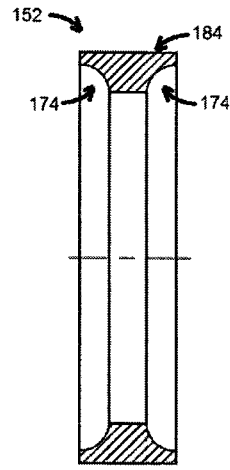
FIG. 8 is a cross-sectional side view of an outer race element of the hybrid thrust bearing package of FIG. 2.

Similarly, the rotor ring 130 depicted in FIGS. 4A and 4B comprises an annular support element 162 and a plurality of composite PDC compacts 158 disposed in complementary pockets 164 formed in an upper face 162A of the support element 162. The PDC compacts 158 project from the upper surface 162A of the support element 162, and thus, when the rotor ring 130 is assembled into the hybrid thrust bearing package 116 (FIG. 1), the PDC compacts 158 define an uppermost face 134B of the rotor ring 130. Together, the two faces 134A and 134B define the bearing surface 134 (FIG. 2) of the PDC bearing.

In operation, the two faces 134A and 134B defining the flat bearing interface 134 accommodate a significant proportion axial thrust applied to hybrid thrust bearing package 116. Due to their diamond nature, these surfaces 134A, 134B have a very low coefficient of friction and are extremely hard, enabling them to take large axial loading without undue damage. Additionally, the robustness of these surfaces 134A, 134B permit lubrication and cooling functions to be provided by drilling fluid passing thereover.

The stator ring 126 and the rotor ring 130 each include a plurality of PDC compacts 158 compacts disposed in a radial array around the respective support element 162, 156. In the embodiment depicted in FIGS. 3A and 4A, the stator ring 126 includes twenty-six (26) equally spaced PDC compacts 158 and the rotor ring 130 includes twenty-five (25) equally spaced PDC compacts 158. It will be appreciated that in other embodiments (not shown) any number of PDC compacts 158 may be provided. The inequality in the number of PDC compacts 158 facilitates maintaining full bearing contact between the PDC compacts 158 of the rotor ring 130 and the PDC compacts 158 of the stator ring 126. In some embodiments (not shown) the rotor ring 130 and stator ring 126 may be provided with PDC compacts 158 that differ in a cross-sectional shape to facilitate the maintenance of full bearing contact.

Referring now to FIGS. 5 through 8, the inner race end cap 146 (FIG. 5), the inner race track element 148 (FIG. 6), the outer race end cap 150 (FIG. 7) and the outer race track element 152 (FIG. 8) each include respective concavities 168, 170, 172 and 174 defined therein. The concavities 168, 170, 172 and 174 align to form the races 142A, 142B, 142C, 142D and 142E (FIG. 2). The inner race track element 148 includes a pair of concavities 170 defined on opposing longitudinal sides thereof, and the outer race track element 174 includes a pair of concavities 174 defined on opposing longitudinal sides thereof. Thus, the inner race track elements 148 and the outer race track elements 152 contribute to the definition of a pair of races, e.g., races 142A, 142B, on each lateral side thereof.

In some embodiments, inner circumferential surfaces 178, 180 of the inner race end cap 146 and the inner race track element 148 may be provided with grooves (not shown) defined therein to accommodate an O-ring seal formed with the mandrel 106 (FIG. 1). Similarly, outer circumferential surfaces 182, 184 of the outer race end cap 150 and the outer race track element 152 may be provided with grooves (not shown) defined therein to accommodate an O-ring seal formed with the bearing housing 102 (FIG. 1). O-ring seals defined with the mandrel 106 and bearing housing 102 may serve to rotationally fix the respective inner race element 148 and outer race element 152. Additionally, O-ring seals may contribute to the isolation, or partial isolation of the races 142A, 142B, 142C, 142D from drilling fluid in operation.

Referring again to FIGS. 1 and 2, it will be appreciated that the overall axial length of the hybrid thrust bearing package 116 is relatively short. For instance, the hybrid thrust bearing package 116 may accommodate particular loading conditions with the five races 142A, 142B, 142C, 142D and 142E that a conventional ball bearing thrust package might provide with twelve (12) to fifteen (15) races. Thus, the hybrid thrust bearing package 116 may accommodate a higher load per unit of length than a conventional ball bearing thrust package, and the drilling apparatus 1 may undergo, relatively sharp changes in direction during directional drilling.

The short overall length of the hybrid thrust bearing package 116 may be attributed various factors. Firstly, the use of PDC bearings, which can accommodate extremely high thrust loads, permit a small number of bearing rings to be provided. Additionally, the ball bearing thrust pack 122 accommodates a combination of axial and radial forces, thus limiting the number and or robustness of radial bearings 112, 114.

In other embodiments (not shown), any number of ball bearing races might be provided in combination PDC bearings. For example, the number of races provided might be, e.g., in the range of about four (4) to about twelve (12) races, or more preferably for some applications, be in the range of about five (5) to about (7) races. This arrangement might not only provide an improved load carrying capacity of the motor bearing assembly, but may also improve the operational life of the motor bearing assembly. For example, it has been observed that a traditional PDC thrust bearing package provides about 100 hours of operation for a particular motor assembly, and a traditional ball bearing thrust package provides about 300 to about 400 hours of operation to the motor assembly. A hybrid thrust bearing package as described herein has been observed to provide 1600 or more hours of operation to the motor assembly. This improved performance may be attributed in part to a higher proportion of the radial loads being realized by the ball bearings when used in combination with the PDC bearings of the hybrid thrust bearing package.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. §1.72(b) to allow the reader to quickly ascertain the nature of the technical disclosure. It is submitted with the understanding that it will not be used to interpret or limit the scope or meaning of the claims.

Moreover, it is the express intention of the applicant not to invoke 35 U.S.C. §112, paragraph 6 for any limitations of any of the claims herein, except for those in which the claim expressly uses the word "means" together with an associated function.

What is claimed is:

1. A motor bearing assembly for use in a down-hole drilling apparatus, the bearing assembly comprising;
    a bearing housing defining upper and lower portions, the upper portion of the bearing housing configured for connection to a drill string;
    a mandrel disposed at least partially within the bearing housing, the mandrel configured to rotate about a longitudinal axis extending therethrough; and
    a thrust bearing package disposed radially between the bearing housing and the mandrel, the thrust bearing package comprising:
        a ball bearing thrust pack, the ball bearing thrust pack including a first race, the first race including, the races defined as a generally annular space formed between a first inner race track element, a first inner race end cap, a first outer race track element, and a second outer race end cap, each race track element and race end cap being generally annular in shape and including a generally annular concavity, the concavities adapted such that when the first inner race cap, first inner race track element, first outer race cap, and first outer race track element are assembled, the concavities form the first race, the first race including a plurality of ball bearings movable through the first race;
        an annular stator ring supported by the bearing housing and defining a first flat polycrystalline diamond compact (PDC) bearing surface; and
        an annular rotor ring supported on and rotatable with the mandrel defining a second flat PDC bearing surface;
        wherein the first and second flat PDC bearing surfaces are engaged at a bearing interface oriented generally orthogonally with respect to the longitudinal axis.

2. The bearing assembly according to claim 1, further comprising an upper radial bearing longitudinally spaced from the thrust bearing package, the upper radial bearing defining an annular bearing surface.

3. The bearing assembly according to claim 2, further comprising a lower radial bearing longitudinally spaced from the thrust bearing package, the lower radial bearing comprising an inner annular member coupled to the mandrel for rotation therewith about the longitudinal axis and an outer annular member concentric with the inner annular member and coupled to the bearing housing to resist rotation about the longitudinal axis, the lower radial bearing defining an annular bearing surface between the inner and outer annular members.

4. The bearing assembly according to claim 1, wherein the thrust bearing package defines a plurality of longitudinally spaced races.

5. The bearing assembly according to claim 1, wherein the annular stator ring comprises a plurality of PDC compacts and a support element, and wherein the plurality of PDC compacts are carried by the support element such that the plurality PDC compacts project from a face of the support element to define the first flat PDC bearing surface.

6. The bearing assembly according to claim 5, wherein the second flat PDC bearing surface is defined by a number of PDC compacts that is unequal to a number of PDC compacts defining the first flat bearing surface.

7. A drilling apparatus comprising:
    a bearing housing;
    a drilling motor comprising a power transmission shaft, the drilling motor configured to provide rotational motion to the power transmission shaft about a longitudinal axis relative to the bearing housing;
    a mandrel coupled to the power transmission shaft for rotation therewith, the mandrel extending at least partially through the bearing housing and configured for connection to a drill bit to transmit rotational motion from the power transmission shaft to the drill bit; and
    a thrust bearing package provided to accommodate rotational motion of the mandrel, the thrust bearing package comprising:
        a ball bearing thrust pack, the ball bearing thrust pack including a first race, the first race including, the races defined as a generally annular space formed between a first inner race track element, a first inner race end cap, a first outer race track element, and a second outer race end cap, each race track element and race end cap being generally annular in shape and including a generally annular concavity, the concavities adapted such that when the first inner race cap, first inner race track element, first outer race cap, and first outer race track element are assembled, the concavities form the first race, the first race including a plurality of ball bearings movable through the first race; and
        a set of polycrystalline diamond compact (PDC) bearings defining a generally planar PDC bearing interface substantially orthogonal to the longitudinal axis.

8. The drilling apparatus according to claim 7, further comprising a flow diverter interconnected between the power section and the mandrel, the flow diverter configured to direct drilling fluid exiting the power section to a passage defined through the mandrel.

9. A method of operating a drilling motor, the method comprising the steps of:
    providing a power section and a mandrel, wherein the mandrel is operatively coupled to the power section such that rotary motion is transmitted from the drilling motor to the mandrel;
    providing a hybrid thrust bearing assembly, the hybrid thrust bearing assembly including a ball bearing thrust pack, the ball bearing thrust pack including a first race, the first race including, the races defined as a generally annular space formed between a first inner race track element, a first inner race end cap, a first outer race track element, and a second outer race end cap, each race track element and race end cap being generally annular in shape and including a generally annular concavity, the concavities adapted such that when the first inner race cap, first inner race track element, first outer race cap, and first outer race track element are assembled, the concavities form the first race, the first race including a plurality of ball bearings movable through the first race extending circumferentially about the mandrel and a set of polycrystalline diamond compact (PDC) bearings defining a generally planar PDC bearing interface extending circumferentially about the mandrel;

passing a drilling fluid through the power section to produce rotary motion in the drilling motor, thereby rotating the mandrel about a longitudinal axis; and transmitting a thrust load in the direction of the longitudinal axis through the plurality of ball bearings and through the PDC bearing interface.

10. The method according to claim 9, further comprising the steps of:

providing a drill bit coupled to the mandrel; and engaging a subterranean formation with the drill bit to produce a borehole in the subterranean formation.

11. The method according to claim 10, wherein the thrust load is transmitted through the drill bit and the mandrel.

12. The method according to claim 9, further comprising the step of transmitting a radial load through the plurality ball bearings.

* * * * *